Oct. 1, 1968  H. W. JOHNSON, JR  3,404,260
ANALYZING VARYING SIGNALS
Original Filed Dec. 22, 1960  4 Sheets-Sheet 4

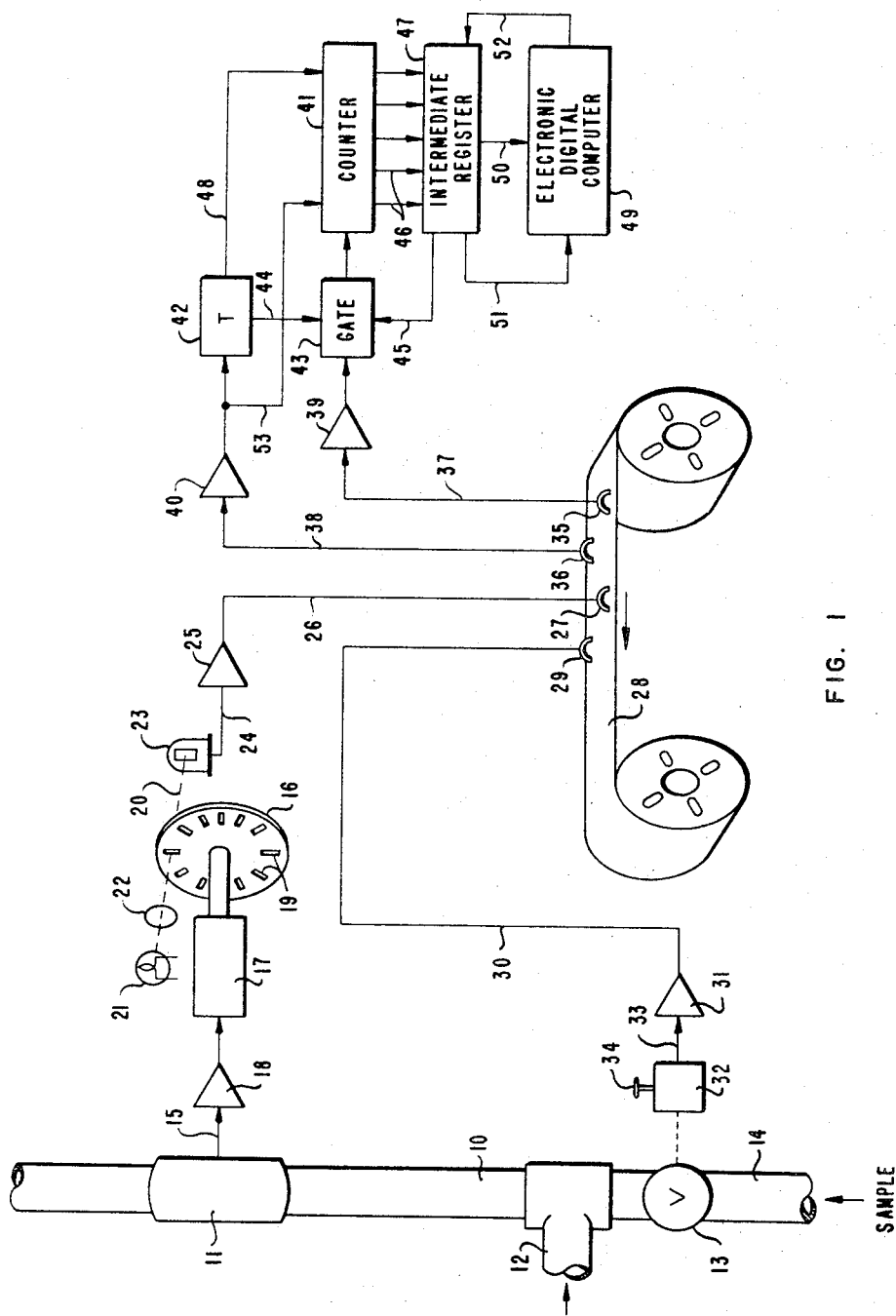

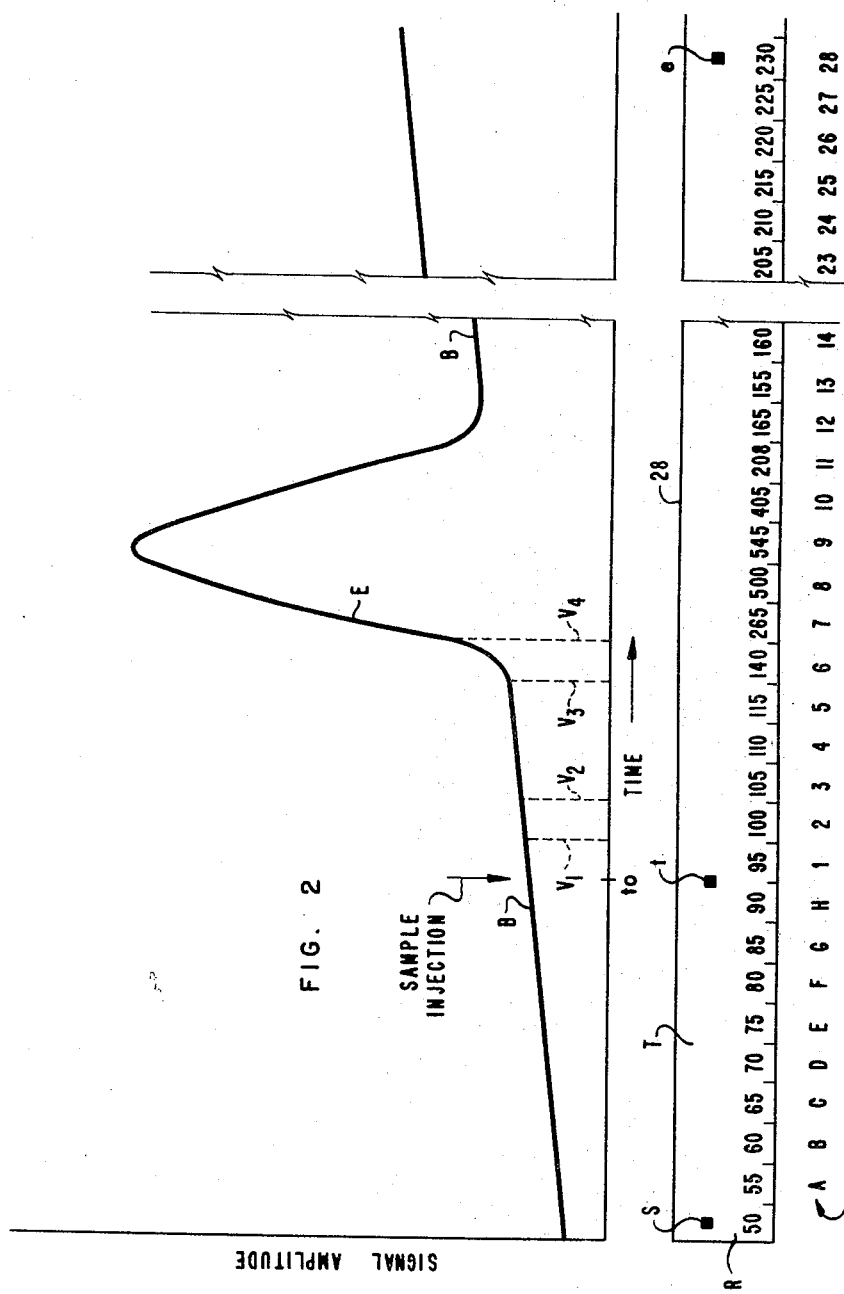

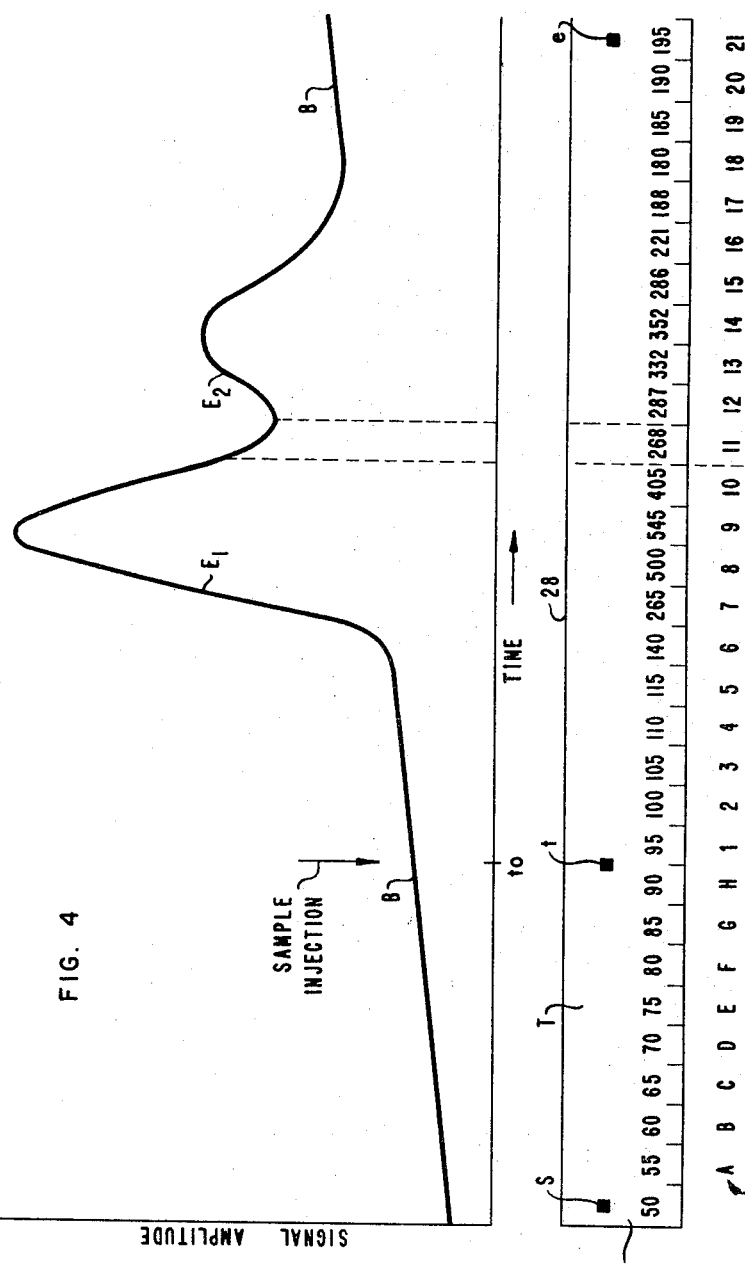

INVENTOR:
HENRY WILSON JOHNSON, JR.
BY: *Oswald H Milmore*
HIS ATTORNEY

United States Patent Office 3,404,260
Patented Oct. 1, 1968

3,404,260
ANALYZING VARYING SIGNALS
Henry Wilson Johnson, Jr., Walnut Creek, Calif., assignor to Shell Oil Company, New York, N.Y., a corporation of Delaware
Continuation of application Ser. No. 77,554, Dec. 22, 1960. This application Sept. 8, 1965, Ser. No. 490,764
17 Claims. (Cl. 235—151.35)

This is a continuation of my application Ser. No. 77,554 filed Dec. 22, 1960, now abandoned.

The invention relates to the analysis of a signal having a changing amplitude to determine the magnitudes of excursions of the signal amplitude from and back to a base amplitude which may be zero, a constant other than zero or may itself be varying at a uniform or nearly uniform rate. It is applicable to a variety of signals representing different types of data, such as the output from a capillary or other gas-liquid chromatographic instrument (herein for brevity called a GLC unit) wherein the signal is an electrical voltage and represents the measurement made on the effluent stream of a property thereof, e.g., thermal conductivity as measured in a conductivity cell, the said signal increasing from a base amplitude each time a component separated in the GLC unit passes through the cell and returning to the then applicable base amplitude, so that a curve in which ordinates represent the said amplitude and abscissae represent time would display a series of excursions or peaks above a base. The invention is also applicable to a variety of other signals of variable amplitude (sometimes called analogue-type signals) which may be either electrical or pneumatic, and may be the outputs from analytical or control instruments. They may be continuous or in the nature of step functions.

An "excursion" of the signal amplitude or of its curve, as used herein, denotes the total changes involved in a deviation from a base line and the return thereto. It will be understood that the area under the part of the curve which represents one excursion is usually the time integral of the signal between the start and end of the excursion. Such excursions are often—although less accurately—called "peaks."

As applied to GLC practice the said area under the part of the curve showing each excursion indicates the amount of a particular component separated in the GLC instrument. In this specific application the height of the excursion is not usually of interest; rather, the area between the curve and the base line is desired and, usually, also the fraction of the sum of all the areas representing all of the several excursions that is represented by each of those areas. Such fractions are determined by what is known as a "normalizing" procedure. It is, further, often desired to ascertain the time at which the peak occurred.

It is known to digitalize such varying signals and to record the digitalized data together with data representing time to permit subsequent processing in electronic digital computers. A drawback of known systems has been the complexity and high cost of the digitalizing units and their associated recording machines, which had to be operatively connected to the signal source whenever such signal-generating instruments were in operation. Thus a costly device had to be provided for each GLC or other signal-generating instrument. Only high-quality recorders could be used for recording digitalized data because the loss of a single bit from the pattern of bits representing the digit would result in a significant alteration in the recorded data. The high cost of such equipment has severely limited the adoption of digitalized recordings and the computer-processing thereof; as a consequence graphical integration of pen-curves recorded on strip charts is the prevailing method of analysis.

It is the general object of the invention to provide an improved method and apparatus for converting a variable-amplitude signal into pulse form suitable for digital computer input which employs simpler and less costly equipment than those heretofore required.

A further object is to record such varying data in a form suitable for analysis in a digital computer wherein the loss of a pulse does not significantly change the results, so that low-cost recording equipment can be used.

A further object is to provide a method and apparatus for analyzing a variable-amplitude signal by recording the signal in pulse form with respect to time, measuring the time-density of said pulses, by counting the pulses occurring within segments of the record representing consecutive short time periods and determining the magnitudes of excursions in the amplitude of the original signal by adding the numbers of pulses within high-pulse-density segments, wherein simple and inexpensive equipment can be used for recording the data.

Another object is to provide a method for analyzing a variable-amplitude signal wherein the magnitudes of excursions in the signal amplitude representing the original data are measured, said measured excursion magnitudes being corrected for drift or adventitious changes in the base amplitude of the signal.

In summary, the method according to the invention comprises the steps of: converting a variable-amplitude source signal into a series of signal pulses the frequency of which varies with, e.g., increases proportionally with, the signal amplitude or varies as some other desired function of said amplitude; recording the said signal pulses with respect to time, e.g., as a series of magnetic bits in one channel of a magnetic tape, whereof another channel may be used to record time either continuously or by a single bit or group of bits denoting the start of the record and, if desired, the end thereof; measuring the density of said recorded pulses with respect to time by counting the numbers of recorded pulses within consecutive record segments which represent short time periods; and adding together the counts for those segments in which the count is significantly above a base or reference density. These last-mentioned segments and the corresponding time periods are herein called "occupied segments" and "occupied periods," respectively, and the said base number is the product of the base frequency, as hereinafter defined, and the duration of one time period.

"Time periods," whenever used herein, refers to periods of the source signal and not to the analysis; the latter may be performed at a speed to take more, the same, or less time than that which elapsed during the making of the record. Although, broadly considered, said time periods may be of such duration as to include one entire excursion, it is preferred to use shorter time periods, which are submultiples of the duration of typical excusions. For example, there may be from two to ten such periods during one excursion.

Typically, the said source signal pulses are electrical voltage pulses and their frequency varies proportionally with the original signal amplitude. This is not, however, in every case essential, it being possible, for example, in certain applications to use an inverse relation, in which case the highest frequency prevails at base-amplitude and decreased frequencies denote deviations from the base amplitude. Also, both of these relations can be combined, as when the base amplitude corresponds to an intermediate pulse frequency, deviations of the signal amplitude above said base leading to increased frequencies and those below to decreased frequencies. Further, a linear relation between the signal pulse frequency and the original signal amplitude is not necessary when the nature of the desired analysis is such as to give increased or decreased weight to larger deviations, or in which the original signal is itself not a linear function of the measured data; in the latter case the frequency of the generated signal pulses may have such a relation to the signal amplitude as to re-establish a linear relation between the frequency and the original data.

The said occupied time periods are established in the analysis on the basis of the measured time-density of said pulses. Thus, there is a more or less uniform or uniformly changing recorded pulse frequency (which may in certain cases be zero, although this is not preferred), herein called the base frequency, corresponding to an original signal at the base amplitude. The pulse density, expressed as recorded pulses per unit record length, corresponding to this frequency occurs, i.e., when there is a significant change in the pulse density from the base density, the first occupied time period is established; this is followed by subsequent occupied periods of the same excursion until the frequency again attains the then applicable base frequency or, in the case of contiguous excursions, until the deviation of the frequency again increases. This series of time periods includes one complete excursion and the sum of the counts of the recorded pulses within these periods is a measure of the magnitude of the excursion. In the case of excursions which are contiguous, having no unoccupied periods between them, the counts for the common periods are apportioned between the two excursions. The term "significant" is used above to denote variations in frequency which are great enough to be due to an excursion, as distinguished from the variations due to drift, noise or random variations in the base level of the signal.

For convenience, the terms "base density," "base frequnecy" and "base amplitude" are used herein in the sense described in the preceding paragraph, i.e., to include frequencies or amplitudes which may be uniform or may increase or decrease at a substantially uniform rate and represents a zero deviation of the source signal from its base. For example, if the base frequency is increasing at the rate of three pulses per second and is 40 pulses per second when an excursion commences, it will be 46 pulses per second at the end of an excursion which continues for two seconds.

According to another feature of the invention, the total number of recorded pulses counted during one excursion—whether consisting of one or of a plurality of occupied periods—is corrected to obtain the difference between the said total number and the number of pulses which occurred during the said excursion due to the base frequency. For example, when the recorded pulse frequency increases proportionally with increases in signal amplitude, the product of the number of occupied periods and the base frequency is substracted from the said total number. The result is a count which represents only the deviation of the signal amplitude from its base amplitude.

When the base frequency is essentially constant it may be determined at any part of the record outside of an excursion. However, it is in most cases advantageous to determine the base frequency at two times, e.g., preceding and following the occupied periods, and to reckon the base frequency from these determined values. Thus, in the example given above, the average base freqency is 43 pulses per second; hence 86 would be substracted.

The above-described method can be carried out in apparatus which includes only simple components for the making of the record. Thus, because only pulses are recorded—as distinguished from specific bit configurations representing numbers—the loss of a pulse or two is not serious, and the signal pulses can be recorded on a low-cost, commercially available magnetic tape recorder of the type used for sound, operated at low speed. The record can then be read and analyzed at a much higher speed in any of a variety of electronic digital computers. It is evident that any suitable form of record may be used and the magnetic bits may be discrete magnetic disturbances or take the form of sine waves, provided the pulse frequency is never too low.

The invention is further described with reference to the accompanying drawing forming a part of this specification and showing one specific embodiment by way of example, wherein:

FIGURE 1 is a diagrammatic view of the components of the equipment;

FIGURE 2 is a graph of an original signal;

FIGURE 3 is a plan view of a portion of the tape record;

FIGURES 4 and 5 are views corresponding to FIGURES 2 and 3, respectively, but showing a signal having overlapping excursions.

Figure 6:
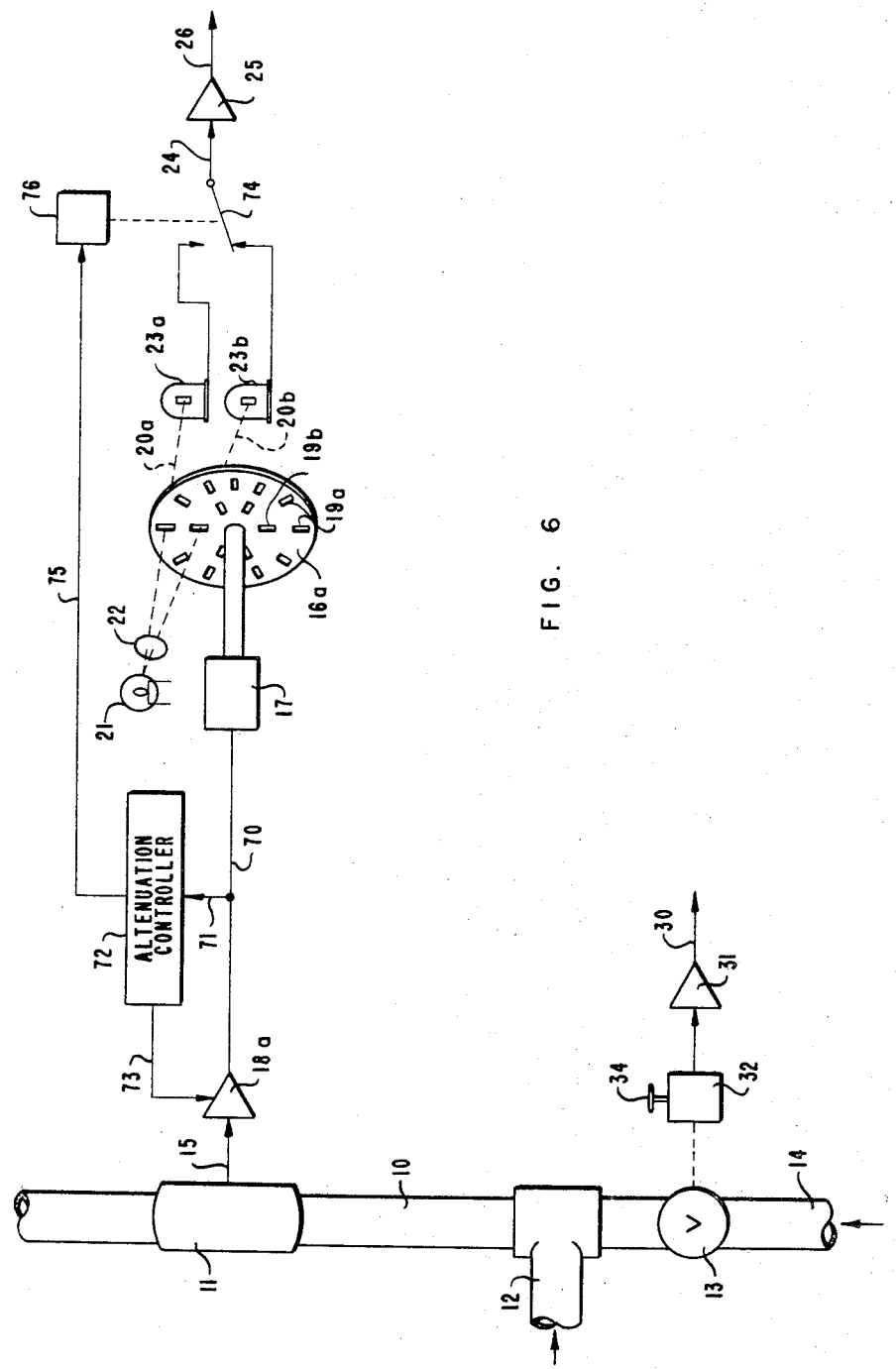
FIGURE 6 is a diagrammatic view of a modified optical system for converting signals to pulses suitable for variable attenuation of the source signal.

Referring to the drawings in detail, 10 represents a pipe through which a fluid stream to be analyzed is fed through a measuring instrument 11, e.g., a thermal conductivity cell 11 which measures the thermal conductivity of the stream continuously. For example, as applied to GLC practice, the pipe 10 would be a chromatographic column through which a carrier gas of constant composition is admitted at 12. The valve 13 admits the sample to be analyzed from the inlet 14. In GLC the valve 13 is opened only momentarily to admit an approximately fixed amount of the sample into the carrier gas. Components of the sample are retained in different parts of the column and are thereafter carried out by the gas through the cell. The instrument 11 emits a variable-voltage source signal which indicates the passage of such components of the sample and is transmitted by a transmission line 15 to any suitable device 17 for rotating an opaque shutter disc 16 at a speed proportional to the signal amplitude. (Single lines are, for simplicity, shown for transmission lines, it being evident that they represent pairs of electrical conductors, as is well understood.)

The said device 17 may, for example, include a ball-and-disc integrator including a motor and may optionally include an amplifier 18 to which the line 15 is connected. The shutter disc has a plurality of windows 19 which are positioned in the path 20 of a beam of light from an exciter lamp 21 focussed by a lens 22 onto a photo-cell 23. This cell emits via its output line 24 a series of electrical signal pulses corresponding to interruptions of the beam 20 and having a frequency proportional to the speed of rotation of the disc and, hence, to the amplitude of the source signal. These pulses are amplified in an amplifier 25 and are transmitted via a line 26 to a recording head 27 which is positioned to record magnetic bits corresponding to the signal pulses on the pulse channel of a magnetic tape 28 which is driven at constant speed by suitable means, not shown. Positioned to record on another channel of the tape—the time channel—is a second recording head 29 which receives time pulses via a line 30 from an amplifier 31. The input to the amplifier 31 may be generated as pulses in a transmitter 32 which can be connected mechanically to the valve 13 and connected to the amplifier by a line 33 to emit a pulse when the valve is opened. The transmitter can further be actuated manually by a button 34.

It may be noted that the automatic actuation of the transmitter 32 is not in every case required. It is useful whenever it is desirable to relate the time of the signal amplitude excursions to some reference step in the process. For example, in GLC operations it is customary to fix the time-locations of the peaks from the instant that the sample to be analyzed is injected into the carrier stream.

Reading heads 35 and 36 operate respectively on the pulse channel and time channel of the tape. It should be understood that these heads may in some instances be the same as the recording heads or that they may be parts of a different tape-reading machine, such as one associated with an electronic digital computer and capable of being operated at a speed different from the recording speed, e.g., higher or lower. The recorded pulses are transmitted from the reading heads via lines 37 and 38, amplified if necessary in amplifiers 39 and 40, and fed to a counter 41 and timer 42, respectively. The former pulse is, in one embodiment, passed through an electronic gate 43. This gate includes a bi-stable circuit which closes the gate to prevent the transmission of recorded pulses from the instant that it receives a time pulse from the timer 42 via a circuit 44 and opens the gate when it receives a ready pulse via the circuit 45. The timer 42 emits pulses through the circuit 44 at constant time intervals after receiving the first pulse via the circuit 38. The counter is of any suitable type, such as an electronic decade counter, or one operating on some other radix, and is connected by as many circuits 46 as there are digital positions to an intermediate register 47. The counter is of the type that is reset to zero immediately after its contents are read out or transferred via the circuits 46, and emits a "ready" pulse via circuit 45 when these operations are completed, e.g., as a specified D.C. voltage. The timer is further connected to the counter by a circuit 48 which receives a transfer pulse from the timer coincidentally with the closing of the gate via circuit 44 to cause the digitalized number accumulated in the counter to be transferred to the register 47 and to reset the counter. The register is connected to an electronic digital computer 49 by one or more circuits 50 (e.g., one line if transfer from the several digit positions in the register to the computer is effected sequentially by shift, or by as many lines as there are digital positions if simultaneous transfer is effected). The register and computer are further inter-connected by a ready circuit 51, which is given a "ready" voltage from the register when the shift from the counter has been completed, and a control circuit 52 which receives a "transfer" voltage from the computer to initiate transmission through the line or lines 50 and to cause the ready voltage in the circuit 51 to be removed. A branch circuit 53 transmits the time-channel pulses to the computer, e.g., via an otherwise unused high-order digit position of the counter.

The counter 41 and register 47 are of the types which transfer the digitalized number and reset the former within a time period which is short in relation to the intervals between the signals from the timer. The absolute speed, of course, will depend upon the speed at which the tape is run and the analysis is made. When used in conjunction with modern electronic computers, these intervals may be, for example, 100 milliseconds; in such a case it is desirable that the "ready" pulse in the circuit 45 appear within 20 microseconds after the pulses are applied to the circuits 44 and 48. In this manner the gate 43 is closed for only a negligible fraction of one time interval and the loss of an excessive number of pulses is avoided.

The transfer speed between the register and the computer may be slower than that into the register but should be sufficiently fast to permit the transfer and one cycle of computation within the computer to be completed well within one time interval. Thus, for the 100 millisecond time interval indicated, the transfer time could be 300 microseconds or less.

When the data have been transferred to the intermediate register the latter emits a "ready" voltage via the circuit 51. When the computer has completed its cycle of computations, as described below, and is ready to accept new data, it tests the voltage in the circuit 51; if it indicates "ready" the computer transmits a transmission signal through the control circuit 52 to the register to cause the data therein to be transmitted to the computer and removes the ready voltage from the circuit 51. This transfer is completed before the next transfer to the register from the counter.

Because the timer, gate, counter, intermediate register and computer are known per se, commercially available, and subject to a wide variety of embodiments, they are not herein described in detail.

In operation, a carrier gas is admitted at 12 and passed through the cell 11, and the shutter disc 16 is rotated at a speed proportional to the amplitude of the signal from the cell in the circuit 15. This causes the photocell to emit a series of signal pulses at a frequency proportional to the signal amplitude. The magnetic tape 28 is placed in motion, e.g., at a low speed such as 1 to 20 inches per second, and the button 34 may be depressed to record a "start of record" bit $s$ on the tape in the time channel T (FIGURE 3) by the head 29, although this is optional. The pulses from the photocell are recorded as magnetic bits by the head 27 on the record channel R of the tape. To start the test the valve 13 is opened momentarily and again closed. This injects the sample from the inlet 14 causing selective absorption in the GLC column. The continuous stream of the carrier gas carries successive portions of the adsorbed sample through the cell 11. The signal amplitude and, hence, the signal pulse frequency are varied as these portions are detected. Opening the valve also actuates the transmitter 32 to cause a "start-of-test" bit $t$ to be recorded in the time channel. An "end-of-test" bit $e$ can be recorded by depressing the button 34 when all of the absorbed material has passed through the cell.

FIGURE 2 shows the signal emitted by the cell 11, abscissae being on the same time scale as the tape shown in FIGURE 3 and ordinates representing the amplitude. The drawing shows a base amplitude B which is gradually increasing and one excursion E rising from and returning to the base, although a series of such excursions would occur in most tests, usually separated but in some instances touching or overlapping. The non zero, gradually increasing condition of the base signal may be attributed to the inherent operation of the cell 11, the amplifier and/or to other unknown causes.

FIGURE 3 shows the tape record. It being impossible to show the numerous magnetic bits in the record channel R, the numbers of bits recorded within the equal tape segments denoted by tick marks at the tape edge, corresponding to equal test time periods, are written in numbers within the record channel in the drawing. These time periods being undefined during the recording step may be regarded at this stage as arbitrary; they were selected to correspond to periods established subsequently during the analysis.

To analyze the record, the tape 28 is re-wound and played back using read heads 35 and 36. When the start-of-record bit $s$ is read the timer 42 commences to send pulses via the circuits 44 and 48 at pre-set, constant time intervals, depending upon the speed of play-back. For example, these time intervals may be 0.1 second and, when the tape is played back at 20 times the speed at which the record was made, each interval represents 2 seconds of test time. A series of time periods is thereby established; these are identified by letters and numbers at the bottom of FIGURE 3. Vertical lines $V_1$ and $V_2$ in FIGURE 2 delimit the second of these periods following the instant that the sample was injected, and FIGURE 3 shows that there are 100 pulses recorded within the segment of the tape representing this time period; similarly, in the sixth time period, marked by lines $V_3$ and $V_4$, 140 pulses were recorded. It will be noted that these numbers of pulses are proportional to the areas under the curve within the respective periods.

The numbers of recorded pulses in successive tape segments are counted as follows: When the first pulse is transmitted from the timer the counter 41 is reset (any earlier data read out of it being ignored). The counter accumulates the pulses transmitted from the line 37 during each period and when the next pulse occurs in circuits 44 and 48 the gate 43 is closed and the accumulated number is transferred by circuits 46 to the intermediate register 47. The counter is immediately reset to zero. When this is completed the circuit 45 causes the gate to open, to start counting the pulses of the next time period. (The actual number of pulses counted may be slightly less than the number of recorded bits because any pulse transmitted while the gate is closed is lost; however, because the gate is closed for only a short time a negligibly small number of pulses is lost.) This process is continued until the end-of-test pulse *e* is read.

Immediately upon completion of a transfer of a number into the register 47 the circuit 51 receives a "ready" from the register and, when the computer senses this and is in condition to receive new data, it causes the data to be read in by sending a transmission pulse via the circuit 52 to cause the data from the register to enter the computer and the ready voltage to be removed from circuit 51. The computer is programmed to perform the following operations; however, it should be understood that these operations could be performed manually, as by operating the tape at a speed so slow that the contents of the register (or of the counter) could be recorded following each pulse from the timer, as by copying from a visual display or by a printing machine, or by recording the successive counts in a series of registers:

(1) Each received digit is subtracted from the previous digit to obtain a "drift count," which is stored. This may be positive or negative. For example, the number "55" for the first period, A, is subtracted from "60," for the second period, B, to obtain a drift count of +5. This is a measure of the base line drift. Because the drift may be slowly changing it is desirable to use only a series, such as six, of the last values in the compensation steps noted below.

(2) A negative drift-compensated count is determined by subtracting from the last-received digit the sum of the previously received digit, the prevailing drift count (preferably the average for the previous six periods) and a noise allowance. The noise allowance should be greater than random fluctuations in the count. In the example illustrated the noise level was, for clarity, assumed to be zero, and the noise allowance is taken as one. Hence, the drift-compensated count for the period H is $$(90-85-5-1)$$

or −1. Thus, the noise allowance causes this count to be negative. It remains negative as long as the frequency remains at the base frequency. So long as this count remains negative the drift count is used to re-estimate the base line drift as was explained in 1, above.

(3) Optionally, the periods are numbered sequentially starting with $t_0$. This is insured by starting the count when the second pulse (indicating the start-of-test pulse *t*) is received by the computer from the circuit 53. These numbers are shown in FIGURE 3.

(4) When the drift-compensated count assumes a positive value, the number of the period and the counts for successive periods are accumulated. The count for the preceding period is stored. For example, when period 6 is reached its value is (140−115−5−1) or +19. Period 6 is, therefore, the first occupied period and the number "6" and counts "115" and "140" are stored separately. Subsequent counts are added to the latter count for the duration of the excursion. For subsequent periods positive (instead of negative) drift-compensated counts are determined by adding the noise level instead of subtracting it. Thus, the drift-compensated count for the period 7 is (265−140−5+1) or +121.

(5) Optionally (when step 3 is practiced), when the positive drift-compensated count turns negative, indicating that the peak in the curve has been passed, the number of the step is stored to identify the time of the peak. For example, when the period 10 is reached the positive drift-compensated count is (405−545−5+1) or −144, and the number 10 is recorded.

(6) When the positive drift-compensated count turns negative (as in period 10) the period counts continue to be accumulated as described in 4 so long as the compensated counts remain negative, but the counts are also stored separately. Thus, the counts 405, 208, 165 and 155 for periods 10–13 are added to bring the accumulated count to 2383.

(7) When the positive drift-compensated count again turns positive (as in period 14, when it assumes a value of +1) indicating tentatively that the base line has been reached, the number of the period is stored and negative drift-compensated counts are again determined by subtracting the noise allowance. Also, starting from this period the drift counts are again determined and accumulation of counts ceases; the count for the current period, e.g., "160" is stored separately.

(8) When the negative drift-compensated count remains negative for a pre-selected number of periods, e.g., three, the return of the frequency to the base line is confirmed and the separately-stored counts for the periods 10–13 may be discarded. (They would otherwise be used as is described below, in connection with FIGURES 4 and 5.)

(9) When the end pulse *e* is read the tape reader is stopped and data input to the computer ceases. The count for each excursion is then corrected for the position of the base line, by subtracting a base count, i.e., the number of pulses equivalent to the area beneath the base line within the periods included in the excursion, e.g., periods 6 through 13 in the example stated. This may be performed in any suitable way, such as the following. The terms used are defined:

$P_1$ and $P_2$ are the serial numbers of the first occupied period and the first period after the excursion in which the positive drift-compensated count turned positive, viz., 6 and 14, respectively, in the example.

$C_a$ is the total count in the last unoccupied period preceding the excursion, viz., 115.

$C_b$ is the total count in the closest unoccupied period following the excursion, viz., 160.

$P_{a+1}$ is the period immediately following that for which $C_a$ applies, viz., 6.

$P_b$ is the period for which $C_b$ applies, viz., 14.

(As will appear, when excursions overlap $P_1$ and $P_2$ are not necessarily the same as $P_{a+1}$ and $P_b$, respectively.)

The base count which is subtracted from the accumulated excursion count is then given by the formula:

$$(P_2-P_1)\left[C_a+\left(\frac{P_2+P_1+1}{2}\right)P_{a+1}+1-\left(\frac{C_b-C_a}{P_b-P_{a+1}+1}\right)\right]$$

Substituting the values of the example, the formula yields 1100. Subtracting this from the count of 2383 yields a count of 1283 for the magnitude of the excursion.

In some applications the random noise may be excessive and prevent reliance on one base-line count before and after an excursion. In such cases the average of several periods both before and after the excursion can be used to replace $C_a$ and $C_b$, the formula being then modified appropriately.

Referring to FIGURES 4 and 5, there are shown a signal and its record having two excursions $E_1$ and $E_2$, the latter commencing before the former has returned to the base line. The left-hand parts of these views, through period 10, are the same as FIGURES 2 and 3. Processing is as was described above for steps 1–7. However, the drift-compensated count does not remain negative for several periods as described in step 8. Instead, after turning positive in period 12 (as it did in period 14, as in the earlier example) it remains positive in period 13. The following steps are in this instance practiced following step 7:

(8a) When the negative drift-compensated count turns positive without becoming negative or remaining negative for a preselected number of periods (signalling the end of one excursion and the start of another), the operations in steps 4–7 are repeated as before, with the difference that the counts for the overlap periods are apportioned between the two excursions. Any suitable apportionment may be used and the following empirical method is merely suggestive: The count for the earlier period is subtracted from that for the later period and the difference is divided by a divisor equal to the sum of the counts for the later period and that preceding the earlier period less twice the count for the earlier period to obtain a factor. For the data shown in FIGURE 5, this yields:

$$(287-268) \div (287+405-2\times 268) = 0.122$$

This factor 0.122 is multiplied by the count in the earlier period 11 to obtain a number which must be subtracted from the accumulated count for excursion $E_1$ and apportioned to excursion $E_2$. Thus, the count for $E_1$ through period 11 was 2123; subtracting 33 (the product of 0.122 and 287) yields 2090 as the final cumulative count for the first excursion. The computed count of 33 is included in the counts for the excursion $E_2$. The remaining periods are processed as was described for FIGURES 3 and 4, so that the total count for the excursion $E_2$, i.e., 33 plus the count for the periods 12 through 18 is 1879.

The foregoing formula becomes increasingly accurate as the lengths of the periods are decreased in relation to the durations of the excursions.

These total counts are diminished by the size of the base counts as was previously explained. However, in this case the overlap period is apportioned by the above-mentioned factor, so that a fractional number of periods are reckoned; in other words $P_1$ and/or $P_2$ may assume fractional value. Thus, in the example 0.122 of period 11 is apportioned to the excursion $E_2$, so that excursion $E_1$ is reckoned as ending at 11.878; this value is assigned to $P_2$ for excursion $E_1$, as well as to $P_1$ for the excursion $E_2$.

For excursion $E_1$ the values for the six constants, in the order given above in the definition of terms, is 6, 11.878, 115, 185, 6 and 19. The formula yields a base count of 777 which, when subtracted from 2090 gives 1313 as the corrected count for excursion $E_1$. Similarly, for excursion $E_2$ these constants are 11.878, 19, 115, 185, 6 and 19, yielding a base count of 1173 and giving, when subtracted from 1879, a corrected count of 706.

FIGURE 6 shows a modification of the pulse generator which permits the ratio between the source signal amplitude and the rotational speed of the shutter disc to be varied. In some applications it is desirable to vary the ratio of the source signal to the amplified signal to the device 17 (or to the mechanical movement produced therein). For example, when a single ratio is used and the source signal is subject to large variations, the shutter disc must be brought to correspondingly high speeds and it is often not practicable to accelerate and decelerate the disc and its motor sufficiently suddenly to follow the source signal amplitude faithfully. Again, the source signal (or output from the amplifier 18) may be connected to other instruments, such as the pen-positioning element of a strip chart recorder, which is constructed to operate at different ranges, so that in one range a moderately low source signal will move the pen to its full deflection while at another range full pen deflection occurs only at a higher source signal, such as twice or four times the former. When, in the latter example, the said pen-positioning element is connected to the ball cage of a ball-and-disc integrator to drive the shutter disc 16 at a speed proportional to the pen positon, the ratio of the rotational speed to the source signal is inherently one of several different values. While this change in ratio could be corrected by recording the prevailing ratio and multiplying the pulses by a suitable factor, it is usually easier to correct the number of pulses generated, so that there is always the same ratio between the source signal amplitude and the generated pulse frequency.

The preferred constancy in ratio is attained by the embodiment according to FIGURE 6 wherein the recorder and analysis units are not shown but would be included in practice and like reference numbers denote elements as described for FIGURE 1. The output line 70 from the amplifier 18a to the drive device 17 has a branch line 71 which transmits the signal amplitude to an attenuation controller 72. The amplifier 18a has several amplification (or attenuation) ranges, selected in accordance with a signal transmitted from the controller 72 via a line 73. The controller 72 may be set manually or automatically in response to the maximum amplitude in the line 71 to step the range to a lower one, i.e., to increase the attenuation when a preset amplitude is exceeded. The shutter disc 16a has a plurality of rings of windows 19a, 19b, the numbers of which correspond to the attenuation ranges. Thus, if for a given source signal the amplitude in the output line 70 has values of 1 and 0.5 for two attenuation ranges, there will be half as many windows 19b in the inner ring as windows 19a in the outer ring. There is a separate photocell 23a, 23b, positioned in the path of each beam of light 20a, 20b, emanating from the exciter lamp 21 and lens 22 through the outer and inner windows, respectively. A switch 74 selectively connects any one of the photocells to the input line 24 to the amplifier 25. The switch 74 which may be an electro-magnetic relay, a stepping switch, or an electronic gate, is controlled by the attenuation controller 72 through a control line 75 and a control element 76.

In operation, when the amplifier 18a is operated with a high-level signal output in the line 70, the switch 74 is in the condition shown and the system operates as was described for FIGURE 1. The light beam 20b, interrupted by the inner row of windows 19b, activates the photocell 23b, which is operatively connected to the amplifier 25. When the signal amplitude exceeds a predetermined level, e.g., that at which a recording pen would move off its chart, the attenuator 72 is stepped to attenuate the signal, producing a reduced signal amplitude in the line 70, say one-half of the former amplitude, and causing the shutter disc 16a to rotate half the speed in relation to the source signal. At the same instant the controller transmits a signal through the line 75 to move the switch 74 and connect the photocell 23a to the amplifier 25. Because the windows 19a are now effective and there are twice as many windows 19a as there are windows 19b, the same pulse frequency is generated for a given source signal.

I claim as my invention:

1. A method for determining the magnitudes of excursions of a signal amplitude, said signal being of the type which deviates from and returns to a base amplitude, said method comprising the steps of: converting said signal into a series of signal pulses having a frequency which varies with changes in amplitude of the said signal; recording said signal pulses with respect to time; measuring the density of said recorded pulses within successive segments of the record which represent successive time periods; and accumulating the number of pulses within a consecutive series of said segments within which the pulse density exceeds a predetermined base density corresponding to said base level.

2. A method as defined in claim 1 wherein the time periods represented by said segments are shorter than one-half the duration of one excursion of said signal amplitude.

3. In combination with the steps specified in claim 1, the steps of counting the number of pulses occurring in said record during a base segment of the record in which said signal is at said base density to determine a base frequency and correcting said accumulated number by the number of pulses due to said base frequency which occurred during said series of record segments.

4. Method as defined in claim 3 wherein said base frequency is the average of the counts in base segments which are positioned respectively ahead of and after the excursion.

5. A method for determining the magnitudes of excursions of a signal amplitude, said signal being of the type which increases from and returns to a base amplitude, said method comprising the steps of: converting said signal into a series of signal pulses having a frequency which increases with increases in the amplitude of said signal; recording said signal pulses with respect to time as magnetic bits on an elongated magnetic record medium by moving said medium at a uniform speed past a recording point; reading the magnetic bits on said record medium and thereby producing a series of electrical pulses; measuring the density of the said electrical pulses with respect to time by counting the numbers of electrical pulses within consecutive record segments which represent equal time periods shorter than one-half the duration of one excursion of the signal amplitude; comparing the count for each said record segment with the count for the previous record segment and thereby determining a base density; and adding together the number of electrical pulses within a series of consecutive record segments within which the pulse density is significantly greater than said base density to determine a count for one excursion.

6. In combination with the method according to claim 5, the step of correcting the said count for one excursion by subtracting therefrom the number of pulses due to said base frequency which occurred during said series of record segments.

7. A method for determining the magnitudes of excursions of a signal amplitude, said signal being of the type which increases from and returns to a base amplitude, said method comprising the steps of: converting said signal into a series of signal data pulses having a frequency which increases proportionally with increases in the amplitude of said signal; recording said signal data pulses with respect to time as magnetic bits on a pulse channel of an elongated magnetic record medium by moving said medium at a uniform speed past a record point; reading the magnetic bits on said record medium by moving the medium at a uniform speed past a reading point for and thereby producing a series of electrical data pulses; establishing a series of consecutive, equal time intervals each representing a time period less than half the duration of one excursion of said signal amplitude; counting the number of data pulses within each of said time intervals; determining a drift count by subtracting the count for each period from that for the next period; determining a negative drift-compensated count by subtracting from the count for each period the sum of the count for the preceding period, the prevailing drift count, and a noise allowance; modifying the immediately preceding step to determine a positive drift-compensated count by adding instead of subtracting the noise allowance for period after that in which the negative drift-compensated count turns positive to and including the period in which the positive drift-compensated count changes from negative to positive; and adding together the counts for occupied periods to determine an accumulated count, the first occupied period being that during which the positive drift-compensated count turns positive.

8. In combination with the steps defined in claim 7, determining a base count representing the data pulses due to said base amplitude which occurred during said occupied periods, and subtracting the said base count from the said accumulated total count.

9. In combination with the steps defined in claim 7, the steps of recording on said record medium in a separate channel thereof a magnetic bit representing a time of said signal; counting the said time periods from the instant said time bit is read from the record medium; and correlating the time of the peak of the excursion with serial number of said time period by registering the time period in which the positive drift-compensated count turns negative.

10. In apparatus for analyzing a signal having variable amplitude, the combination of means for converting said signal to a series of electrical signal pulses at a frequency which varies with the amplitude of the signal, said means including a shutter mounted for rotation and having circumferentially spaced windows, means for rotating said shutter at a speed which varies with said signal amplitude, excited lamp means, and photocell means positioned to receive a beam of light passing from said exciter lamp through said windows for interruption at a frequency determined by the speed of the shutter; a magnetic recorder including a movable magnetic recording medium, a recording head and means for moving said medium at a constant rate with respect to the said head; and circuit means for connecting the output from said amplitude to pulse-converting means to said recording head so that said pulses are recorded as magnetic bits with a density along the length of the medium which increases with the signal amplitude.

11. In combination with the elements recited in claim 10, a second recording head for said recorder positioned in laterally offset relation to the first-mentioned head to record on another channel of said recording medium information relating to time and means for transmitting a time signal to the second recording head.

12. In combination with the elements according to claim 10, means for driving said shutter at a plurality of speeds for a given signal amplitude in accordance with a selected attenuation, said shutter having windows arranged in rings at different radii from the shutter disc, there being a different number of windows in different rings, said exciter lamp means being positioned to emit separate beams of light through said several rings of windows to said photocell means; and means for selecting one of said beams of light to activate the photocell means.

13. In apparatus for analyzing a signal having a variable amplitude and representing a property of a physical sample of material which varies with time, the combination of: means for initiating a test of said sample; means for measuring said property during said test and producing a signal having a variable amplitude that is related to said measured property; means for converting said signal to a series of electrical pulses at a frequency which varies with the amplitude of the said signal; a magnetic recorder including a movable magnetic recording medium adapted for magnetic recording in separate tracks, a plurality of recording heads cooperating respectively with said tracks, and means for moving said medium at a constant rate with respect to said heads; first circuit means connecting the output from said amplitude to pulse converting means to one of said recording heads, so that said pulses are recorded in one of said tracks as magnetic bits with a density along the length of the medium which increases with the signal amplitude; a signal generator responsive to the initiation of said test for emitting a signal related to the start of said test time; and second circuit means connecting the output from said signal generator to the other of said recording heads for recording time by at least one magnetic bit in the other of said tracks.

14. In combination with the apparatus defined in claim 13, means for reproducing separately said recorded pulses and time-related signal, said means having respectively first and second output circuits; a resettable counter for counting said pulses; a normally open gate connected between said first output circuit and said counter; a register connected to said counter for the transfer of the accumulated total from the counter to the register responsively to a transfer pulse; and a timer connected to said second output circuit for emitting said transfer pulses at uniform intervals responsively to said time-responsive signal and connected to said counter for initiating said transfer and resetting the counter and to said gate for closing the gate during such transfer.

15. In apparatus for analyzing a signal having a variable amplitude and representing a property of a physical sample of material which varies with time, the combination of: means for measuring said property during a test of said sample and producing a signal having a variable amplitude that is related to said measured property; means for converting said signal to a series of electrical pulses at a frequency which varies with the amplitude of said signal; a magnetic recorder including a movable magnetic recording medium, a recording head connected to said converting means, and means for moving said medium at a constant rate with respect to said head, for recording said electrical pulses; means for reproducing said recorded pulses; and a counter for counting said pulses connected to said reproducing means.

16. In combination with the apparatus defined in claim 15, wherein said counter is resettable, a register connected to said counter for the transfer of the accumulated total from the counter to the register responsively to a transfer pulse; and a timer for emitting transfer pulses at uniform intervals connected to said counter for initiating said transfer and resetting the counter.

17. In combination with the apparatus defined in claim 16, a normally open gate interconnected between said reproducing means and the counter; and circuit means connecting the timer and the gate for closing the gate during the transfer of the total from the counter to the register.

References Cited
UNITED STATES PATENTS

| | | | |
|---|---|---|---|
| 2,513,583 | 7/1950 | Shaper et al. | 340—174.1 XR |
| 2,537,427 | 1/1951 | Seid et al. | 340—347.4 |
| 2,807,797 | 9/1957 | Shoemaker | 340—174.1 |
| 2,839,149 | 6/1958 | Piety | 235—183 XR |
| 2,851,596 | 9/1958 | Hilton. | |
| 2,987,704 | 6/1961 | Gimpel et al. | 235—151 XR |
| 3,069,896 | 12/1962 | Kindred et al. | 73—23.1 |

MALCOLM A. MORRISON, *Primary Examiner.*

W. M. JOHNSON, *Assistant Examiner.*